United States Patent
Lange

(10) Patent No.: US 10,053,842 B2
(45) Date of Patent: Aug. 21, 2018

(54) SANITARY FITTING

(71) Applicant: Fluehs Drehtechnik GmbH, Luedenscheid (DE)

(72) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 22 days.

(21) Appl. No.: 15/109,882

(22) PCT Filed: Jan. 26, 2015

(86) PCT No.: PCT/EP2015/051474
§ 371 (c)(1),
(2) Date: Jul. 6, 2016

(87) PCT Pub. No.: WO2015/135675
PCT Pub. Date: Sep. 17, 2015

(65) Prior Publication Data
US 2016/0326731 A1    Nov. 10, 2016

(30) Foreign Application Priority Data

Mar. 12, 2014    (DE) .................... 20 2014 101 116 U

(51) Int. Cl.
*F16K 11/078* (2006.01)
*E03C 1/04* (2006.01)
*F16K 27/04* (2006.01)

(52) U.S. Cl.
CPC ........ *E03C 1/0412* (2013.01); *F16K 11/0787* (2013.01); *F16K 27/045* (2013.01);
(Continued)

(58) Field of Classification Search
CPC ............. F16K 11/0787; F16K 11/0785; F16K 11/0782; F16K 11/078; F16K 27/04; F16K 27/045

See application file for complete search history.

(56) References Cited

U.S. PATENT DOCUMENTS 2,620,813 A    12/1952  Bloomfield
3,267,956 A *   8/1966  Kline ..................... F16K 27/04
                                                    137/360
(Continued)

FOREIGN PATENT DOCUMENTS

DE    20 2008 003 921 U1    6/2008
WO         96/29530 A1       9/1996

OTHER PUBLICATIONS

International Search Report of PCT/EP2015/051474, dated May 28, 2015.
(Continued)

*Primary Examiner* — Matthew W Jellett
*Assistant Examiner* — Christopher Ballman
(74) *Attorney, Agent, or Firm* — Collard & Roe, P.C.

(57) ABSTRACT

A sanitary fitting includes a pipe section which has a valve seat and which receives a valve upper part which bears against the valve seat and which includes a head piece which is traversed centrally by a spindle which is rotatably and/or pivotably mounted in the head piece and via which a control disc can be moved relative to an inlet disc within the head piece, wherein the valve upper part is releasably connected to the pipe section, wherein a device for the defined positioning of the valve upper part within the pipe section in at least two rotary positions offset by an angle of orientation is arranged.

5 Claims, 10 Drawing Sheets

Figure 1:
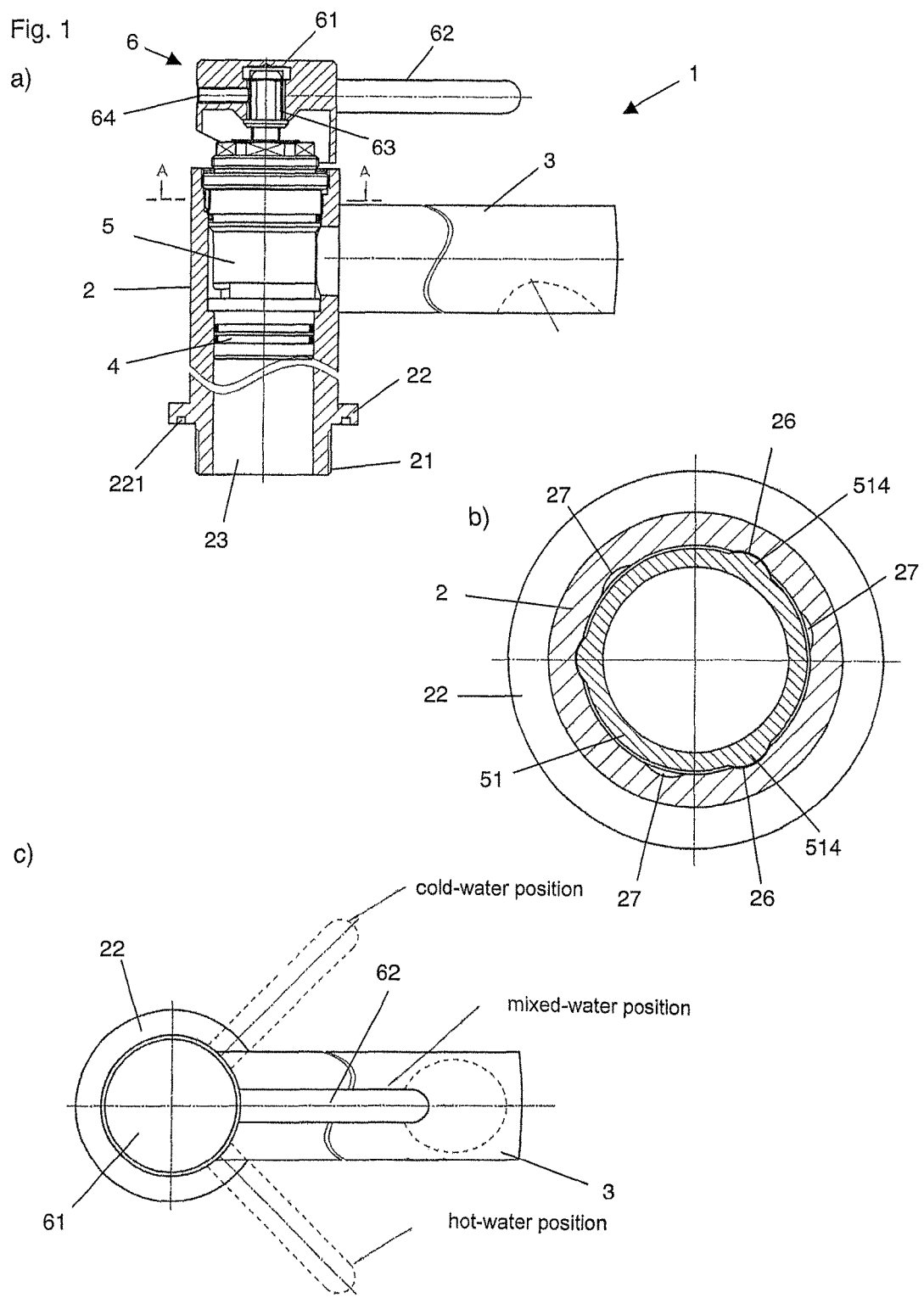

(52) U.S. Cl.
CPC ............... *E03C 1/04* (2013.01); *F16K 11/078* (2013.01); *F16K 11/0782* (2013.01); *F16K 11/0785* (2013.01); *F16K 27/04* (2013.01)

(56) References Cited

U.S. PATENT DOCUMENTS

| | | | | | |
|---|---|---|---|---|---|
| 3,282,295 | A | * | 11/1966 | Skriletz | F16K 11/078 137/625.17 |
| 3,835,887 | A | * | 9/1974 | Mongerson | F16K 11/078 137/625.17 |
| 3,880,400 | A | * | 4/1975 | Cole | F16K 11/022 137/636.1 |
| 4,010,772 | A | * | 3/1977 | Palmer | F16K 11/078 137/625.17 |
| 4,050,475 | A | * | 9/1977 | Watts | F16K 11/078 137/625.17 |
| 4,056,124 | A | * | 11/1977 | Goldsmith | F16K 11/078 137/625.17 |
| 4,084,607 | A | * | 4/1978 | Fagert | F16K 11/078 137/312 |
| 4,478,249 | A | * | 10/1984 | Fleischmann | F16K 11/078 137/454.6 |
| 4,709,728 | A | * | 12/1987 | Ying-Chung | F16K 11/078 137/597 |
| 5,301,715 | A | * | 4/1994 | Becker | E03C 1/0401 137/359 |
| 5,397,099 | A | * | 3/1995 | Pilolla | E03C 1/04 251/129.03 |
| 5,755,262 | A | * | 5/1998 | Pilolla | E03C 1/055 137/625.17 |
| 6,202,686 | B1 | * | 3/2001 | Pitsch | E03C 1/04 137/359 |
| 7,032,619 | B2 | * | 4/2006 | Gaenzle | E03C 1/04 137/615 |
| 9,719,602 | B2 | * | 8/2017 | Chang | F16K 11/072 |
| 2012/0279595 | A1 | * | 11/2012 | Huck | F16K 19/006 137/896 |
| 2013/0056664 | A1 | | 3/2013 | Huang | |
| 2014/0053925 | A1 | * | 2/2014 | Esche | F16K 37/0041 137/554 |
| 2015/0055433 | A1 | * | 2/2015 | Lange | F16K 11/0787 366/132 |
| 2016/0084403 | A1 | * | 3/2016 | Kemp | F16K 3/08 251/279 |
| 2016/0265201 | A1 | * | 9/2016 | Hoogendoorn | F16K 31/605 |

OTHER PUBLICATIONS

Response to German Patent Attorney to EP Patent Office in PCT/EP2015/051474 dated Sep. 29, 2015 with English translation of relevant parts.

* cited by examiner

Fig. 3
a)
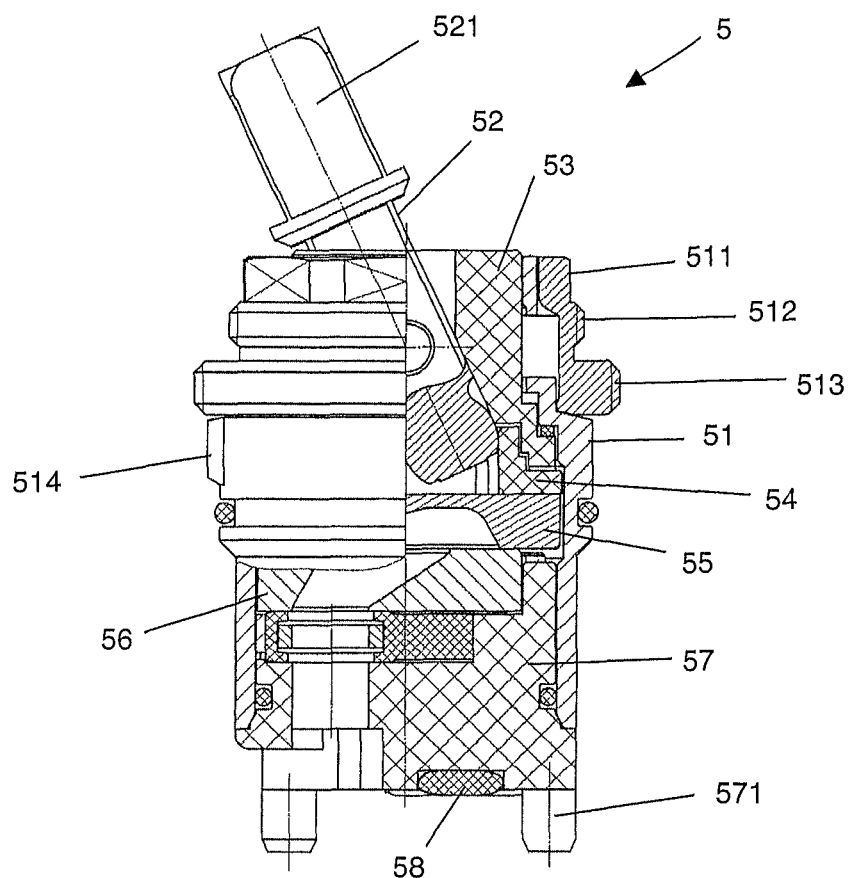
b)
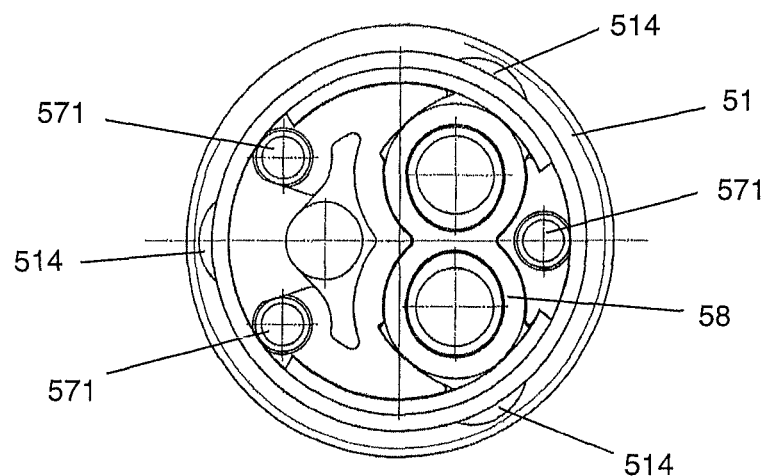

Fig. 4
a)
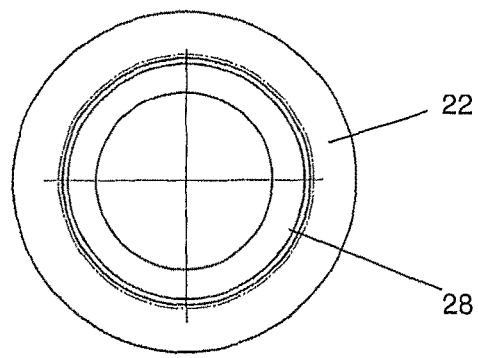
b)
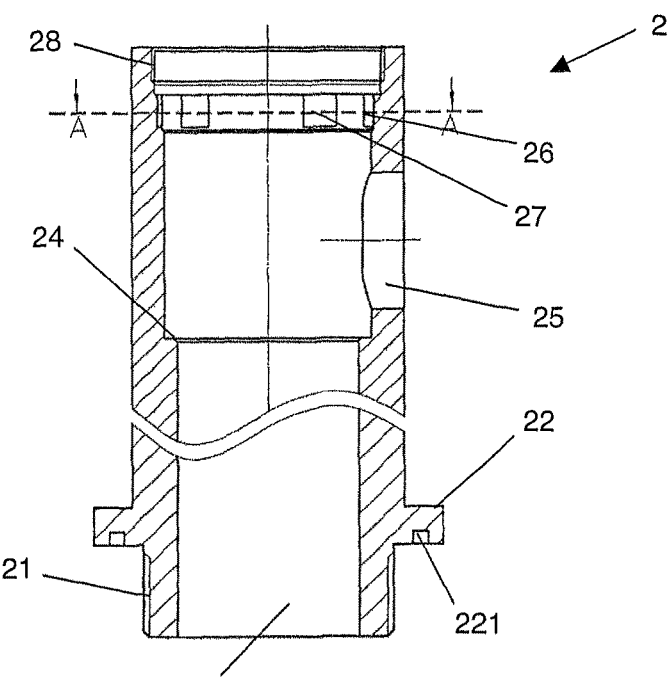
c) Section A-A:
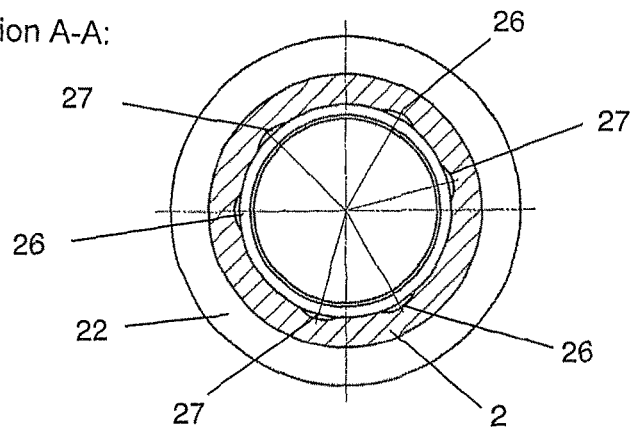

Fig. 7
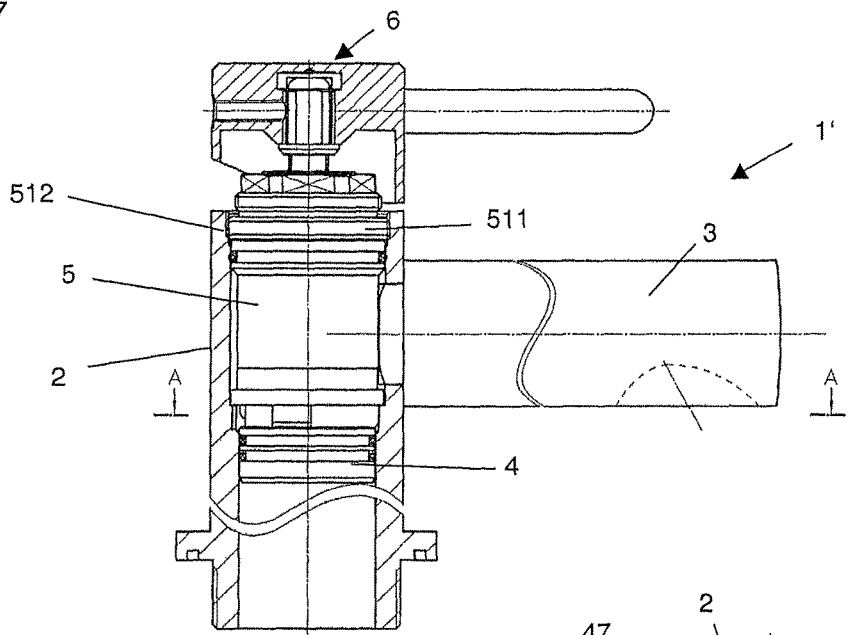
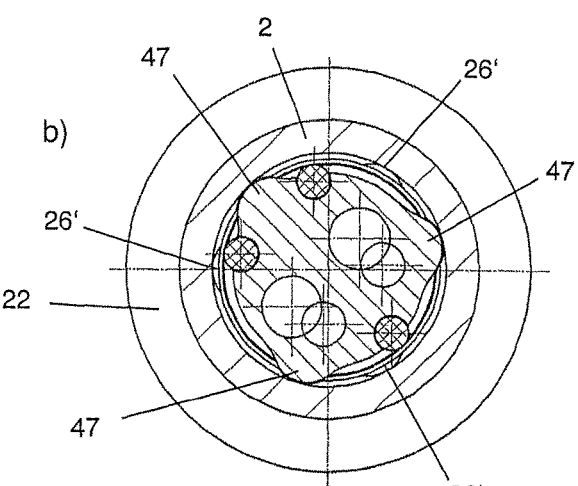
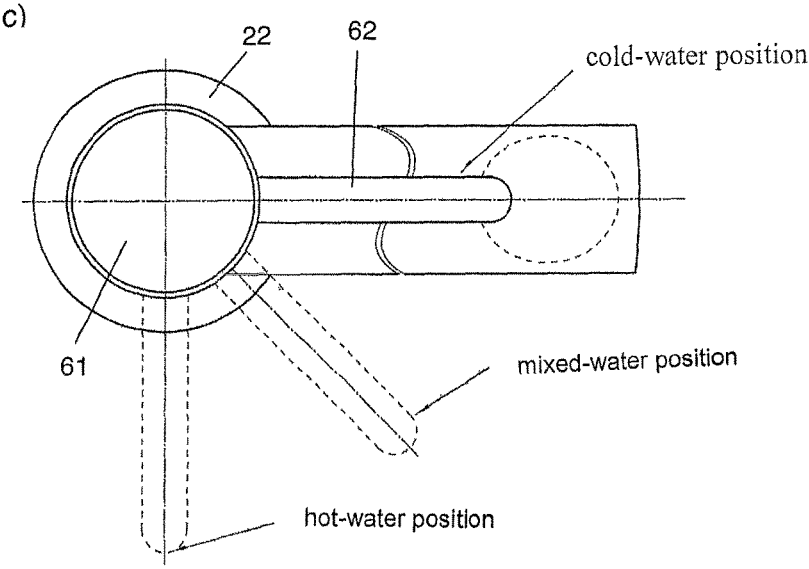

Fig. 8
a)
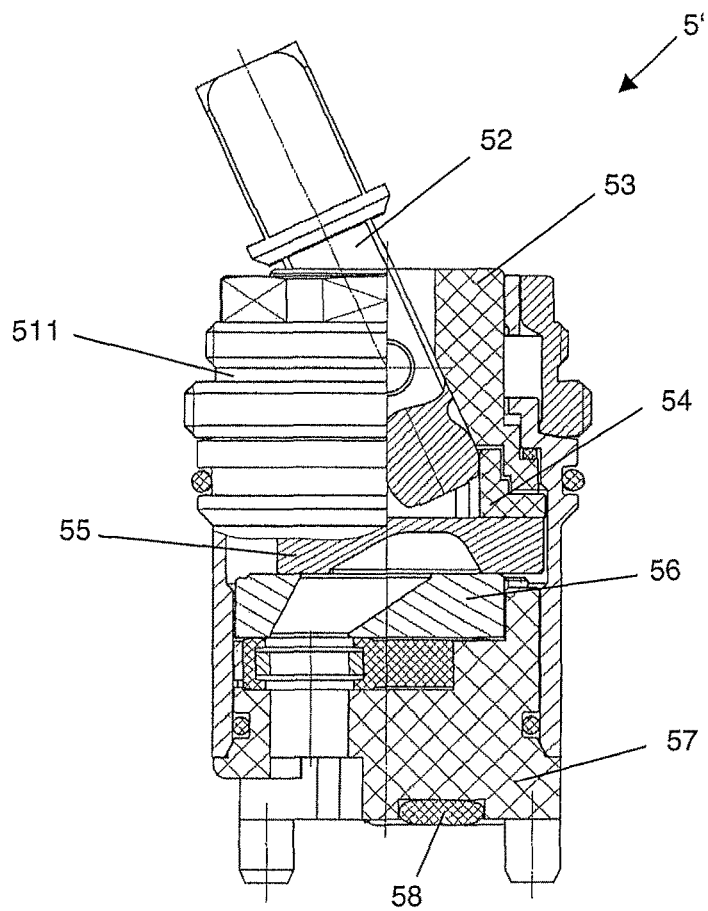
b)
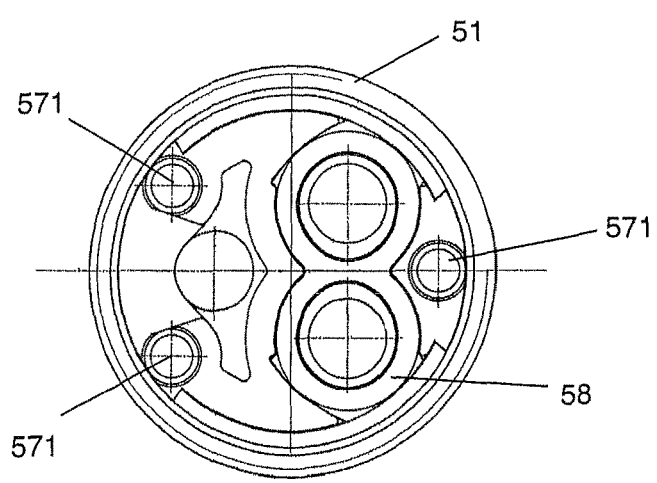

Fig. 9
a)
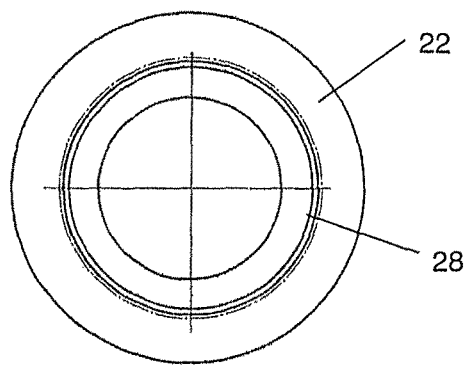
b)
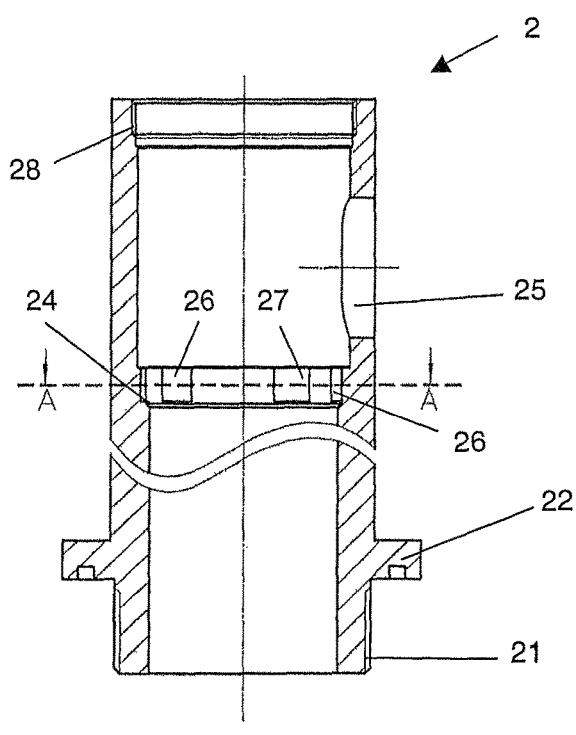
c)
Section A-A:
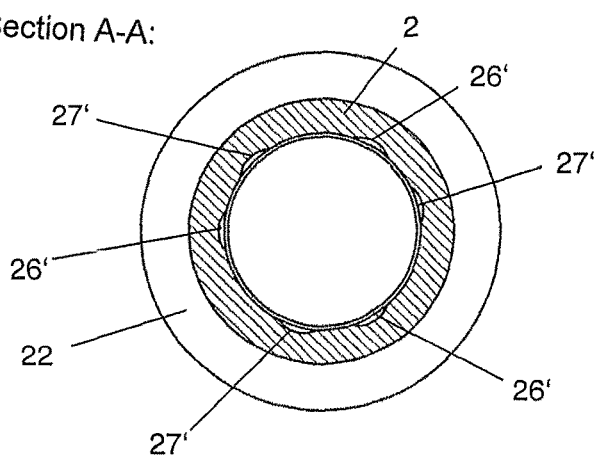

SANITARY FITTING

CROSS REFERENCE TO RELATED APPLICATIONS

This application is the National Stage of PCT/EP2015/051474filed, on. Jan. 26, 2015, which claims priority under 35 U.S.C. § 119 of German Application No. 20 2014 101 116.1 filed on Mar. 12, 2014, the disclosure of which is incorporated by reference. The international application under PCT article 21 (2) was not published in English.

The invention relates to a sanitary fitting.

Such fittings are used for controlled mixing of hot and cold water, with subsequent issuance. They comprise an upper valve part, by means of which mixing and issuance of the water from the fitting is controlled. For this purpose, the upper valve part is screwed into the housing of the fitting. The upper valve part can be operated by way of a rotary handle or lever. Such an upper valve part essentially consists of a head piece into which a spindle projects axially, which spindle is mounted so as to pivot in a spindle accommodation mounted so as to rotate, and engages into a slide piece that is connected with a control disk, which disk corresponds with a passage disk, which is sealed off relative to a connection disk or a bottom piece, by way of a seal.

In the installation of the upper valve part, this part is introduced into the fitting, wherein the spindle of the upper valve part is oriented in such a manner that the operating lever to be set onto it is situated in the center position, aligned with the outlet of the fitting. The center position of the operating lever is the position in which hot water and cold water flow through the outlet mixed in equal parts, thereby resulting in an average water temperature. For reasons of saving energy, it is required in many countries that the lever position aligned with the outlet brings about issuance of cold water. This results from the regular behavior of the operator of positioning the operating lever aligned with the outlet in the closed valve position, for optical reasons. This results in the problem that in the previously known fittings, only one defined position of the spindle of the upper valve part exists after the part has been introduced into the fitting, and for this reason, a separate fitting structure is required for what is called the "cold-start" position last mentioned.

This is where the invention wishes to provide a remedy. The invention is based on the task of making available at fitting of the aforementioned type, which allows both a mixed-water position and a cold-start position when the operating lever is aligned with the outlet of the fitting. According to the invention, this task is accomplished via the characteristics described herein. With the invention, a sanitary fitting of the operating lever is made available, which allows a mixed-water position as well as a cold-start position when the operating lever is aligned with the outlet of the fitting. A defined orientation of the spindle is made possible when installing the upper valve part in the fitting, using the means for defined positioning of the upper valve part within the pipe piece, in at least two rotary positions offset by an orientation angle, thereby achieving the desired orientation of the operating lever set onto the spindle. In this regard, the orientation angle advantageously amounts to between 15° and 90°, preferably between 25° and 60°, particularly preferably 45°, between at least two defined rotary positions, in other words two possible positions of the upper valve part within the pipe piece, rotated at an angle relative to one another. The valve position of the upper valve part can be adjusted by means of the selection of the angle of rotation, when the operating lever set onto the spindle is aligned with the outlet, so that positions other than the "cold-start" position can also be established.

In an embodiment of the invention, the upper valve part is connected with the pipe piece by way of an attachment ring. In this regard, the connection can be structured, for example, in the form of a screw connection, a bayonet connection, or an engagement connection.

Preferably, the valve seat is formed by a valve seat body, preferably configured to be cylindrical, which body is preferably releasably disposed within the pipe piece.

In a further development of the invention, a projection is disposed on the inner wall of the pipe piece, which projection corresponds with at least two recesses introduced into the outer mantle of the upper valve part, offset by the orientation angle. In this way, simple orientation of the upper valve part in the pipe piece in the "mixed-water" position or "cold-start" position (or the desired position) is made possible. Alternatively, a projection can also be disposed on the outer mantle of the upper valve part, which projection corresponds with at least two recesses introduced into the inner wall of the pipe piece, offset by the orientation angle.

In an embodiment of the invention, the valve seat body possesses at least one positioning bore that corresponds with at least one positioning pin disposed on the upper valve part, wherein the valve seat body lies in the pipe piece on a step disposed within the pipe piece, running around the circumference at least in certain regions, wherein a projection is disposed below or in the region of the step or on the outer mantle of the valve seat body, which projection corresponds with at least two recesses introduced into the outer mantle of the valve seat body or below or in the region of the step, offset by the orientation angle. The at least one positioning pin disposed on the upper valve part, in the installed state, engages into the at least one positioning bore of the valve seat body, thereby guaranteeing defined positioning of the upper valve part on the valve seat body. Such defined positioning is made possible by means of provision of a positioning pin on the valve seat body, so to speak, which pin accordingly engages into a positioning bore provided on the upper valve part. The unit of upper valve part and valve seat body formed in this way can now be positioned in one of the recesses introduced into the crosspiece, offset by the defined orientation angle, by means of positioning the projection disposed on the valve seat body. The same effect can be achieved in that a projection is disposed on the crosspiece, which projection corresponds with at least two recesses introduced into the outer mantle of the valve seat body, offset by the orientation angle. It is advantageous if the at least one positioning pin or the at least one positioning bore of the upper valve part is disposed on a bottom piece that is disposed in the head piece on the side of the passage disk of the upper valve part that is directed opposite to the control disk.

In a further development of the invention, two channels are introduced into the valve seat body, which channels open into a passage channel of the upper valve part, in each instance, wherein the channels of the valve seat body are provided, on their underside facing away from the upper valve part, with a connector for releasable attachment of feed lines. In this way, simple installation of the fitting is made possible. In this regard, connection of the feed lines can take place by way of a screw connection, for example, or also by way of a bayonet connection.

Other further developments and embodiments of the invention are indicated in the remaining dependent claims.

Figure 2:
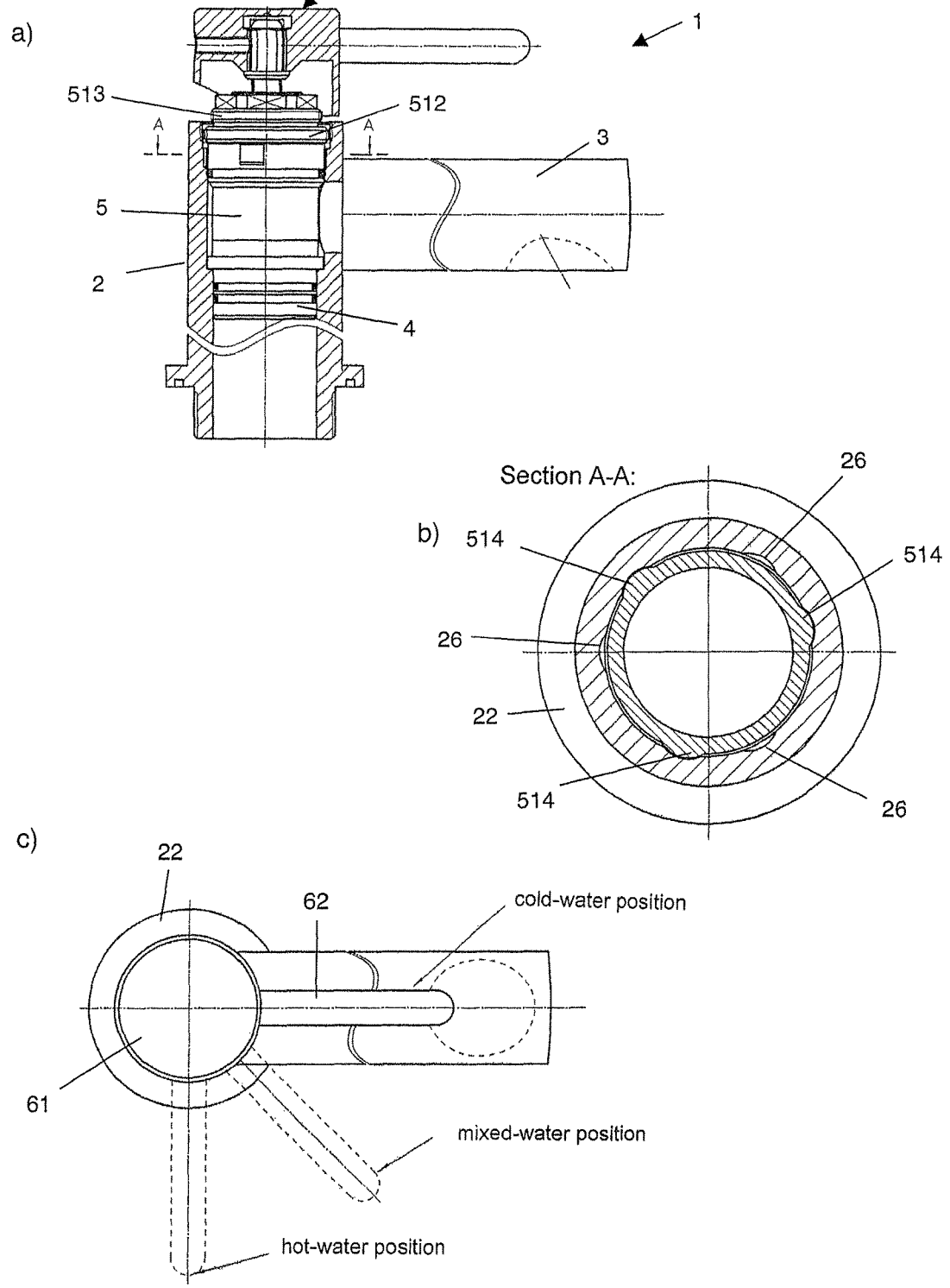
Figure 5:
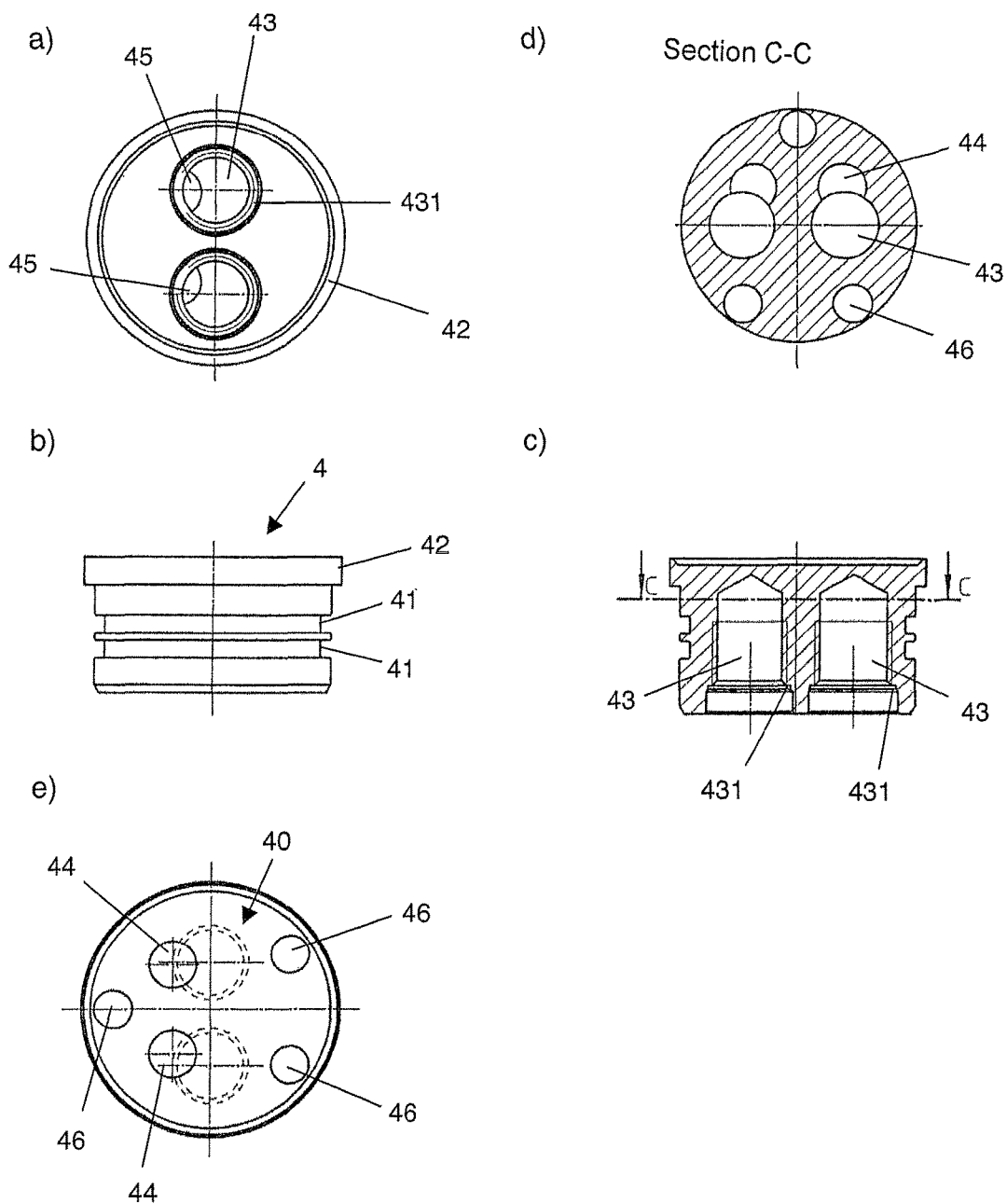
Figure 6:
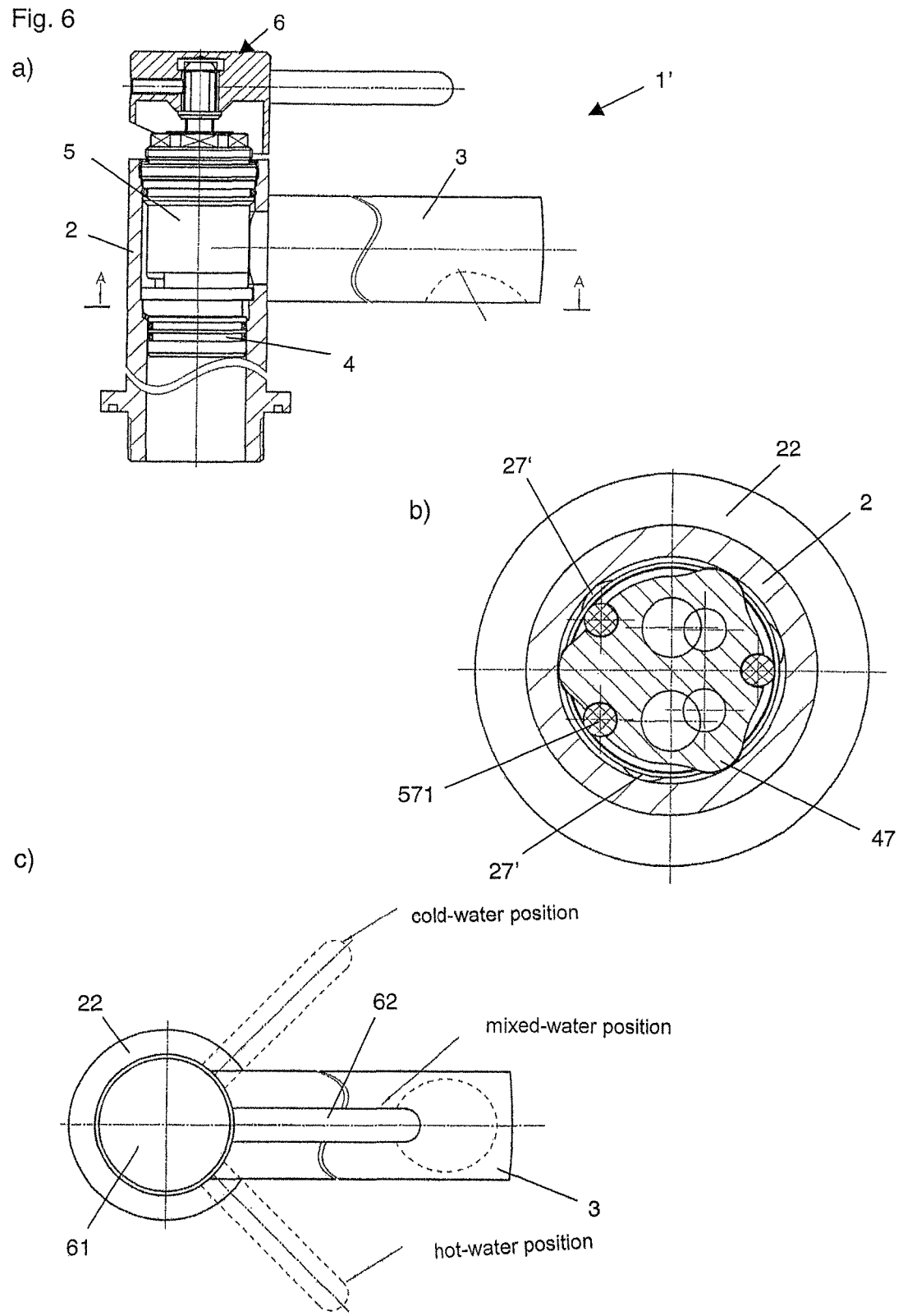
Figure 10:
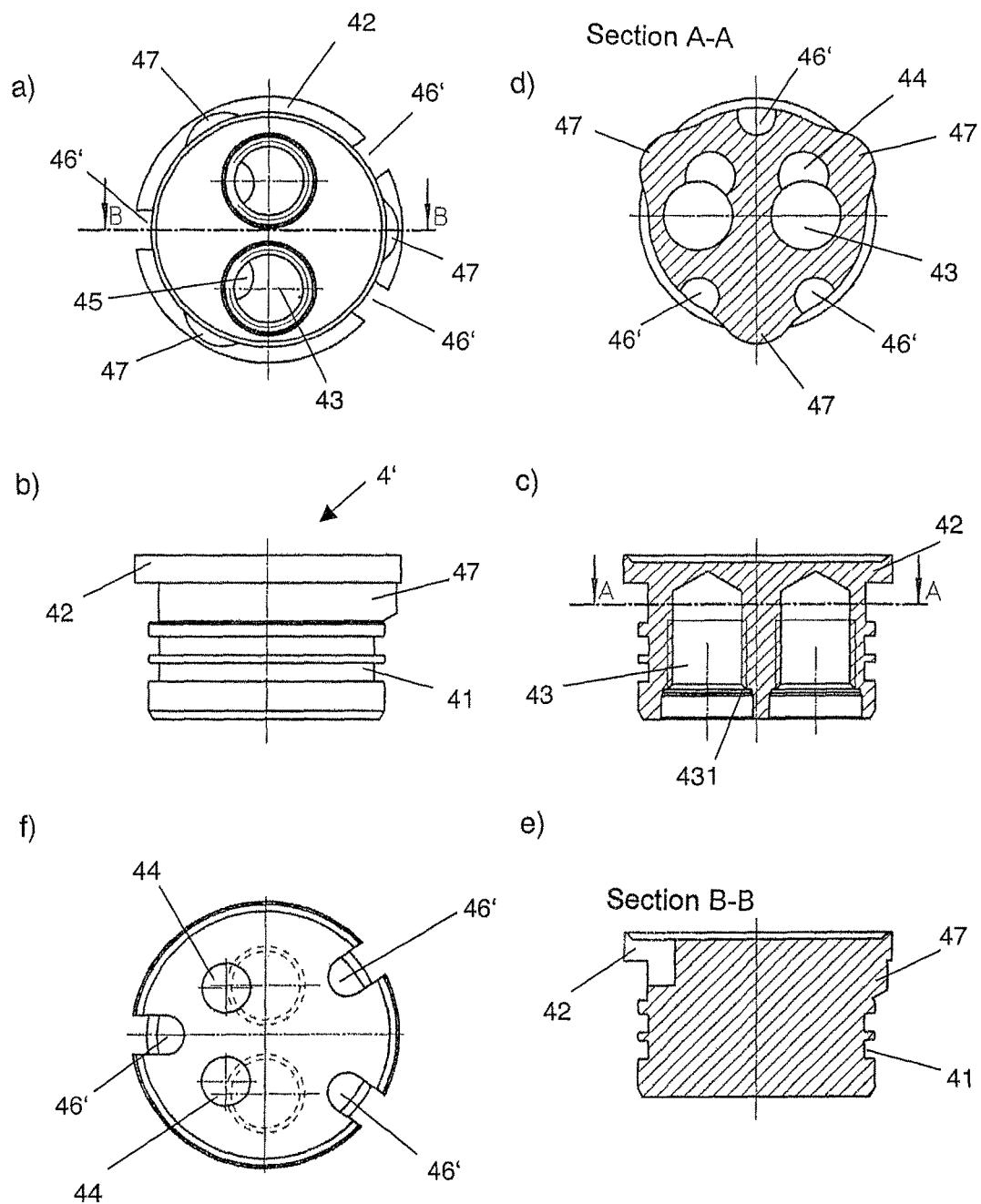

An exemplary embodiment of the invention is shown in the drawings and will be described in detail below. The figures show:

FIG. 1 the schematic representation of a sanitary fitting in the mixed-water position
  a) in longitudinal section;
  b) in cross-section A-A;
  c) in a top view with the cold-water position and hot-water position indicated;

FIG. 2 the representation of a sanitary fitting from FIG. 1 in the cold-start position
  a) in longitudinal section;
  b) in cross-section A-A;
  c) in a top view;

FIG. 3 the schematic representation of the upper valve part of the sanitary fitting from FIG. 1
  a) in partial section;
  b) in a view from below;

FIG. 4 the representation of the pipe piece of the sanitary fitting from FIG. 1
  a) in a top view;
  b) in longitudinal section;
  c) in cross-section A-A;

FIG. 5 the schematic representation of the valve seat body of the sanitary fitting from FIG. 1
  a) in a view from below;
  b) in a side view;
  c) in longitudinal section;
  d) in cross-section C-C;
  e) in a top view;

FIG. 6 the schematic representation of a sanitary fitting in a further embodiment, in the mixed-water position
  a) in longitudinal section;
  b) in cross-section A-A;
  c) in a top view with the cold-water position and hot-water postion and hot-water position indicated;

FIG. 7 the representation of the sanitary fitting from FIG. 6 in the cold-start position
  a) in longitudinal section;
  b) in cross-section A-A;
  c) in a top view;

FIG. 8 the schematic representation of the upper valve part of the sanitary fitting from FIG. 6
  a) in partial section;
  b) in a view from below;

FIG. 9 the representation of the pipe piece of the sanitary fitting from FIG. 6
  a) in a top view;
  b) in longitudinal section;
  c) in cross-section A-A;

FIG. 10 the schematic representation of the valve seat body of the sanitary fitting from FIG. 6
  a) in a view from below;
  b) in a side view;
  c) in longitudinal section;
  d) in cross-section A-A;
  e) in longitudinal section B-B;
  f) in a top view.

The sanitary fitting 1 selected as an exemplary embodiment consists essentially of a pipe piece 2 that is provided with an outlet 3 set orthogonal to it and accommodates a valve seat body 4 having a valve seat 40, against which an upper valve part 5 lies, which part can be operated by way of an operating lever 6.

The pipe piece 2 is configured essentially as a hollow cylinder, and has an outside thread 21 on the end side, which thread is followed by a circumferential flange 22, which is provided, on its underside, facing the outside thread 21, with a circumferential groove 221 for accommodation of a sealing ring. The passage bore 23 of the pipe piece 2 has a diameter-widened segment by which a step 24 for the valve seat body 4 to rest on is formed. Above the step 24, a side bore 25 for accommodation of the outlet 3 is introduced into the pipe piece 2. Above the side bore 25, three trough-like first recesses 26 are introduced into the inner wall of the pipe piece 2, offset by 120°, in each instance. Furthermore, three second recesses 27 are disposed offset from these first recesses 26 by an orientation angle of 45° in the exemplary embodiment, which in turn are offset from one another by 120°, in each instance. An inside thread 28 for accommodation of the first outside thread 512 of the screw sleeve 511 of the head piece 51 of the upper valve part 2 is introduced into the pipe piece 2 on its end that lies opposite the outside thread 21.

The valve seat body 4 is configured essentially in the form of a cylinder. Two grooves 41 for accommodation of sealing rings are introduced into its outer mantle surface, next to one another. On the end side, a circumferential collar 42 is formed on the valve seat body 4. On its underside that lies opposite the collar 42, two dead-end bores 43 are introduced into the valve seat body 4, diametrically, which bores are provided with an inside thread 431 on the end side, in each instance. Furthermore, two dead-end bores 44 are introduced on the top side of the valve seat body 4, facing the collar 42, offset to the dead-end bores 43, which bores overlap with the dead-end bores 43, so that a continuous channel 45 is formed. Furthermore, three positioning bores 46 for accommodation of the positioning pins 571 of the bottom piece 57 of the upper valve part 5 are disposed on the top side of the valve seat body 4.

The upper valve part 5 is essentially formed by a head piece 51, into which a spindle 52 projects axially, which spindle is mounted so as to pivot in a spindle accommodation 53 that is mounted so as to rotate and engages into a slide piece 54, which is connected with a control disk 55, which corresponds with a passage disk 56, which is followed by a bottom piece 57 that accommodates a molded seal part 58. Three positioning pins 571 for engagement into the positioning bores 46 of the valve seat body 4 are formed on the bottom piece 57, at a distance from one another. A screw sleeve 511 is held in captive manner on the head piece 51, which sleeve has a first outside thread 512 for being screwed into the inside thread of the pipe piece 2. A second outside thread 513 for attachment of the head part 61 of the operating lever 6 is affixed above the first outside thread 512. Three projections 514 are disposed circumferentially on the head piece 51, offset by 120° relative to one another, in each instance, the outer contour of which projections essentially corresponds to the inner contour of the first recesses 26 as well as of the second recesses 27 of the pipe piece 2.

The operating lever 6 essentially consists of a cap-shaped head part 61, on which a handle 62 is formed laterally, and which is provided, on the Inside, with an accommodation 63, with which the head part 61 can be pushed onto the square piece 521 formed onto the spindle 52 of the upper valve part 5. Laterally, a threaded bore 64 is introduced into the head part 61, which bore opens into the accommodation 63. The threaded bore 64 accommodates a grub screw—not shown—for fixation of the head part 61 on the square piece 521 of the upper valve part 5.

The valve seat body 4 is introduced into the pipe piece 2 in such a manner that it lies on the step 24 of the pipe piece with its circumferential collar 42. The valve seat body 4 is thereby held within the pipe piece 2 so as to rotate. The upper valve part 5 is mounted on the valve seat body 4, wherein the positioning pins 571 of the bottom piece 57 of the upper valve part 5 engage into the positioning bores 46 of the valve body 4. During the course of installation, the upper valve part 5 can now be introduced into the pipe piece 2 in such a manner that the three circumferentially disposed projections 514 formed on the head piece 51 engage either into the first recesses 26 or, alternatively, into the second recesses 27 of the pipe piece, which are positioned offset relative to the first recesses 26 by an orientation angle of 45°. In this way, it is adjustable, during the course of installation of the upper valve part 5 in the pipe piece 2, whether the sanitary fitting 1 is set up in the mixed-water position (see FIG. 1) or in the cold-start position (see FIG. 2). In the desired position, the upper valve part 5 is subsequently fixed in place by way of the screw sleeve 511, which is screwed into the inside thread 28 of the pipe piece 2 with its first outside thread 512, thereby bracing the upper valve part axially against the valve seat body 4.

In the exemplary embodiment according to FIG. 6, the first recesses 26 as well as the second recesses 27, which are offset from the former by an orientation angle of 45°, are introduced in the inner wall of the pipe piece 2 at the level of the step 24 (see FIG. 9). The three projections that correspond to them, offset from one another by 120°, are formed onto the valve seat body 4 below the collar 42 in this exemplary embodiment (see FIG. 10). The valve seat body 4 can thereby be positioned in the pipe piece 2 in such a manner that the three circumferential projections 47 are introduced either into the first recesses 26, or, alternatively, into the second recesses 27 of the pipe piece 2 that are disposed offset at an orientation angle of 45° from them, and afterward, the circumferential collar 42 of the valve seat body4 comes to lie on the step 24 of the pipe piece 2. In order to allow a view of the first recesses 26 of the second recesses 27 during positioning, the positioning bores 26 in the valve seat body 4 are structured to be open radially outward. The placement of the valve seat body 4 in the pipe piece 2 preferably takes place by way of lines screwed into the dead-end bores 43 of the valve seat body 4 in advance, which lines project out of the pipe piece 2 on the end side. In this regard, the rotary position of the valve seat body 4 within the pipe piece 2 can be checked from above by way of the radially open positioning bores 46.

After positioning of the valve seat body 4 in the pipe piece 2 has taken place, the upper valve part 5 must once again be positioned on the valve seat body 4, wherein the positioning pins 571 of the bottom piece 57 of the upper valve part 5 are introduced into the positioning bores 46 of the valve seat body 4, which bores are open toward the outside. In this way, defined rotational orientation of the upper valve part 5 in the mixed-water position or cold-water position takes place, so to speak. Subsequently, the upper valve part 5 is once again braced against the valve seat body 4 by way of the screw sleeve 511 of the head piece 21, which is screwed into the inside thread 28 of the pipe piece 2, and the head part 61 of the operating lever 6 is mounted on the square pin 521 of the spindle 52.

The invention claimed is:

1. A sanitary fitting, comprising a pipe piece that has a valve seat, which accommodates an upper valve part, which lies against the valve seat and comprises a head piece, through which a spindle passes through the center, which spindle is mounted in the head piece so as to rotate and/or pivot, and by way of which spindle a control disk within the head piece can be moved relative to an inlet disk,
wherein the valve seat is formed by a valve seat body that is disposed within the pipe piece,
wherein the valve seat body possesses at least one positioning bore or one positioning pin that corresponds with at least one positioning pin or positioning bore disposed on the upper valve part for positioning the upper valve part within the pipe piece in at least two rotary positions offset by an orientation angle,
wherein the valve seat body lies in the pipe piece on a step disposed within the pipe piece, running around the circumference at least in certain regions, and two channels are introduced into the valve seat body, which channels open into a passage channel of the upper valve part, in each instance,
wherein the channels of the valve seat body are provided, on their underside facing away from the upper valve part, with a connector for releasable attachment of feed lines,
wherein either
1.) the valve seat body can rotate within the pipe piece and a projection is disposed below the step on the inner wall of the pipe piece or on the outer mantle of the valve seat body, which projection corresponds with at least two recesses introduced into the outer mantle of the valve seat body or below the step on the inner wall of the pipe piece, offset by the orientation angle, the projection being formed in one piece with the inner wall of the pipe piece or with the outer mantle of the valve seat body, or
2.) the valve seat body can rotate within the pipe piece and a projection is disposed on the inner wall of the pipe piece or on the outer mantle of the upper valve part, which projection corresponds with at least two recesses introduced on the outer mantle of the upper valve part or on the inner wall of the pipe piece, offset by the orientation angle, the projection being formed in one piece with the inner wall of the pipe piece or with the outer mantle of the upper valve part.

2. The sanitary fitting according to claim 1, wherein the orientation angle amounts to between 15° and 90°.

3. The sanitary fitting according to claim 1, wherein the upper valve part is connected with the pipe piece by way of an attachment ring.

4. The sanitary fitting according to claim 1, wherein the at least one positioning pin or the at least one positioning bore of the upper valve part is disposed on a bottom piece that is disposed in the head piece on the side of the passage disk that is directed opposite to the control disk.

5. The sanitary fitting according to claim 1, wherein the pipe piece and/or the valve seat body are produced from brass.

* * * * *